United States Patent
Rewers et al.

(10) Patent No.: US 9,163,530 B2
(45) Date of Patent: Oct. 20, 2015

(54) METHOD FOR OPERATING A STEAM CYCLE PROCESS

(75) Inventors: Gregory Rewers, Schwieberdingen (DE); Nadja Eisenmenger, Stuttgart (DE); Achim Brenk, Kaempfelbach (DE); Dieter Seher, Ilsfeld (DE); Hans-Christoph Magel, Reutlingen (DE); Andreas Wengert, Auenwald (DE)

(73) Assignee: Robert Bosch GmbH, Stuttgart (DE)

( * ) Notice: Subject to any disclaimer, the term of this patent is extended or adjusted under 35 U.S.C. 154(b) by 100 days.

(21) Appl. No.: 14/005,600

(22) PCT Filed: Feb. 24, 2012

(86) PCT No.: PCT/EP2012/053132
§ 371 (c)(1),
(2), (4) Date: Nov. 26, 2013

(87) PCT Pub. No.: WO2012/123230
PCT Pub. Date: Sep. 20, 2012

(65) Prior Publication Data
US 2014/0075942 A1   Mar. 20, 2014

(30) Foreign Application Priority Data

Mar. 17, 2011   (DE) .......................... 10 2011 005 722

(51) Int. Cl.
*F01K 21/06*   (2006.01)
*F01K 23/06*   (2006.01)
(Continued)

(52) U.S. Cl.
CPC ................ *F01K 23/065* (2013.01); *F01K 23/10* (2013.01); *F01K 25/08* (2013.01); *F02G 5/02* (2013.01); *F22B 1/18* (2013.01); *F22B 1/1807* (2013.01); *F22B 37/50* (2013.01); *Y02T 10/166* (2013.01)

(58) Field of Classification Search
CPC ....... F01K 23/065; F01K 23/10; F01K 25/08; F02G 5/02; F22B 1/18; F22B 1/1807; F22B 37/50; Y02T 10/166

USPC .............................. 60/39.6–39.63, 597–624; 123/559.1–566, 200–249
See application file for complete search history.

(56) References Cited

U.S. PATENT DOCUMENTS

| 1,654,955 A | 1/1928 | Wettstein |
| 3,174,288 A | 3/1965 | Profos |

(Continued)

FOREIGN PATENT DOCUMENTS

| AT | 509395 | 8/2011 |
| CN | 1469969 | 1/2004 |

(Continued)

OTHER PUBLICATIONS

International Search Report for Application No. PCT/EP2012/053132 dated Oct. 24, 2012 (3 pages).

(Continued)

*Primary Examiner* — Jesse Bogue
(74) *Attorney, Agent, or Firm* — Michael Best & Friedrich LLP

(57) ABSTRACT

The invention relates to a method for operating a steam cycle process for using the heat of an internal combustion engine (2), comprising a conduction circuit (4) in which a working medium circulates. Said conduction circuit (4) comprises at least one pump (6, 13), at least one heat exchanger (8), an expansion machine (10), a feedwater tank (14) for storing the liquid working medium, and a condenser (12). Components of the conduction circuit (4) are frost-proofed by partially evacuating the liquid working medium. After the end of the circulation of the working medium, at least one of the pumps (6, 13) continues to operate in order to evacuate the working medium at least from the pump (6, 13) which continues to operate.

15 Claims, 1 Drawing Sheet

(51) Int. Cl.
*F01K 23/10* (2006.01)
*F01K 25/08* (2006.01)
*F02G 5/02* (2006.01)
*F22B 1/18* (2006.01)
*F22B 37/50* (2006.01)

(56) References Cited

U.S. PATENT DOCUMENTS

| | | | |
|---|---|---|---|
| 4,406,127 A | | 9/1983 | Dunn |
| 5,415,147 A | * | 5/1995 | Nagle et al. .................. 123/563 |
| 5,896,746 A | | 4/1999 | Platell |
| 6,829,894 B2 | | 12/2004 | Bloch et al. |
| 2004/0050050 A1 | * | 3/2004 | Bloch et al. .................... 60/651 |
| 2006/0254309 A1 | * | 11/2006 | Takeuchi et al. ................ 62/501 |
| 2011/0192178 A1 | * | 8/2011 | Ternel et al. .................... 62/118 |
| 2012/0151919 A1 | * | 6/2012 | Bartosch et al. ................ 60/645 |
| 2014/0075934 A1 | | 3/2014 | Rewers et al. |
| 2015/0013338 A1 | * | 1/2015 | Smague et al. ................. 60/645 |

FOREIGN PATENT DOCUMENTS

| | | |
|---|---|---|
| CN | 101084053 | 12/2007 |
| CN | 201318855 | 9/2009 |
| CN | 101650022 | 2/2010 |
| CN | 201650631 | 11/2010 |
| DE | 10228868 | 11/2005 |
| DE | 102007020086 | 10/2008 |
| DE | 102009003850 | 11/2010 |
| DE | 102009022865 | 12/2010 |
| EP | 2357349 | 8/2011 |
| EP | 2466079 | 6/2012 |
| JP | 2008127017 | 6/2008 |
| WO | 2010070786 | 6/2010 |

OTHER PUBLICATIONS

English Machine Translation of DE2009022865 (translated on Mar. 9, 2015).
International Search Report for Application No. PCT/EP2012/057778 dated Aug. 21, 2012 (2 pages).
United States Patent Office Action for U.S. Appl. No. 14/116,801 dated Apr. 1, 2015 (16 pages).

* cited by examiner

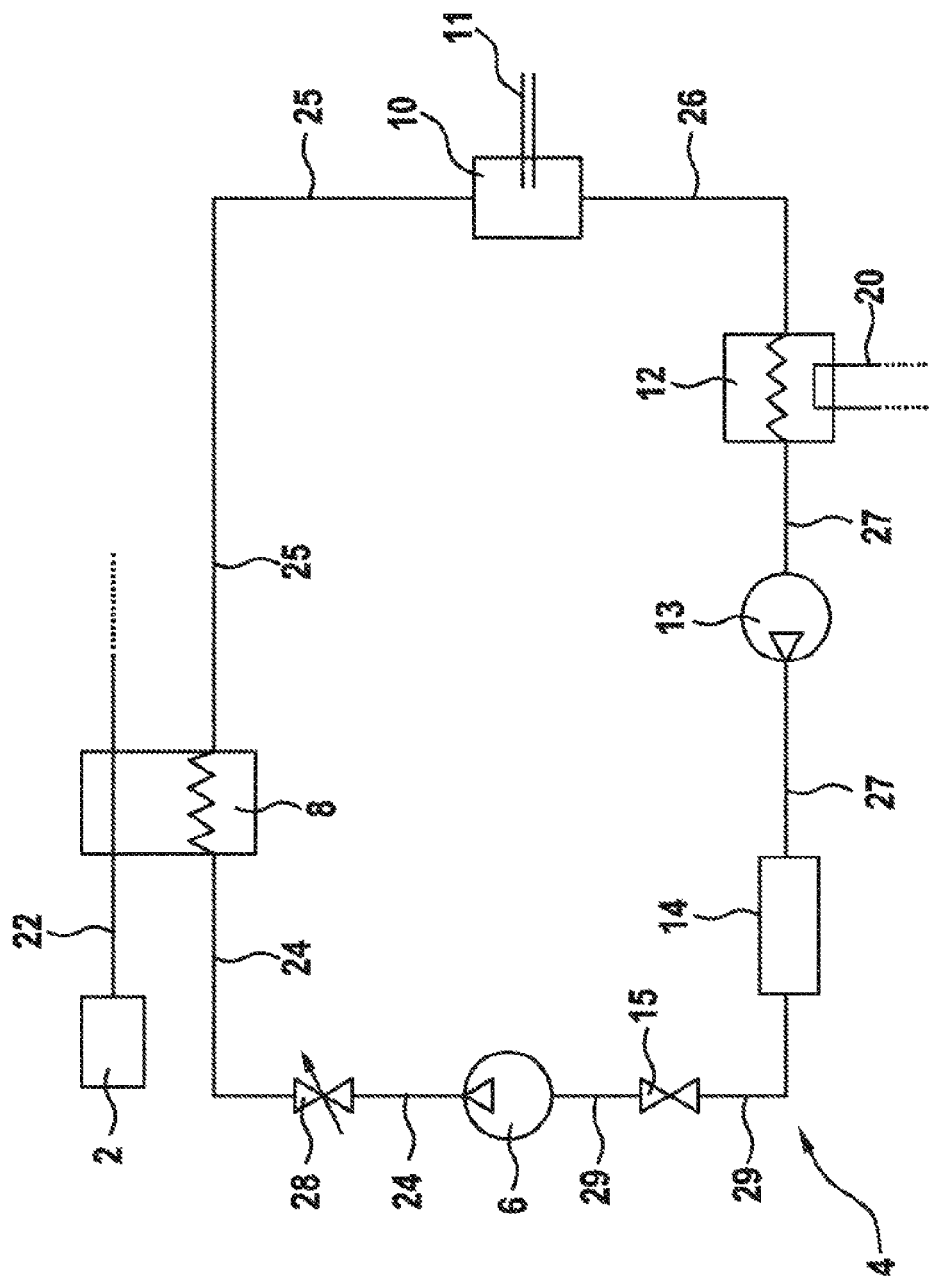

METHOD FOR OPERATING A STEAM CYCLE PROCESS

BACKGROUND OF THE INVENTION

The invention relates to a method for operating a steam cycle process for utilizing the waste heat of an internal combustion engine.

DE 102 28 868 B4 discloses a device for generating mechanical work by means of a steam engine. A feed water tank, a feed pump, an evaporator for steam generation, a steam engine and a condenser are arranged in a closed circuit. Feed water from the feed water tank is delivered to the evaporator by the feed pump. The feed water is evaporated in the evaporator and delivered to a steam engine. The steam engine generates mechanical energy. The expanded steam emerging from the steam engine is condensed by means of a condenser. The condensed water is delivered to the feed water tank. A protective gas space is located above the feed water tank. When the device is not in operation, the protective gas is intended to displace feed water out of the protective gas space from parts of the closed circuit and thereby protect frost-sensitive parts from damage.

SUMMARY OF THE INVENTION

The advantage of the method according to the invention for operating a steam cycle process for utilizing the waste heat of an internal combustion engine, is that, by at least one of the pumps being subsequently operated after the end of circulation of the working medium, the working medium is emptied at least out of the subsequently operated pump and liquid working medium is thereby transported out of the pump. The at least one pump is subsequently operated after the end of circulation until the liquid working medium is removed almost completely from the pump. The at least one subsequently operated pump is made frost-proof by being subsequently operated after the end of circulation of the working medium. If, after the end of circulation of the working medium, the line circuit is exposed to temperatures at which the working medium freezes, there is the risk that components of the line circuit are damaged by the working medium which expands when it freezes. If there is only a small quantity of the liquid working medium still in the subsequently operated pump, damage when the liquid working medium freezes can be avoided.

Components of the line circuit which are connected to the subsequently operated pump, such as, for example, a preceding line, are also emptied as a result of the subsequent operation of the pump and thus, in the event of freezing, are made frost-proof and protected from damage.

The subsequent operation of the at least one pump reveals a method for making sensitive components of the line circuit frost-proof. There is no need for additional protective gas to be introduced into the line circuit in order to displace the liquid working medium. An additional process for removing the protective gas before the subsequent operation of the steam power process is dispensed with. Protection from damage in the event of freezing is afforded solely by means which are present in the line circuit.

It is shown to be especially expedient if the end of circulation of the working medium occurs after a standstill of the internal combustion engine, since, after its standstill, the internal combustion engine cannot transfer any thermal energy to the line circuit and there is therefore no need for further circulation of the working medium and for subsequent operation of the individual components of the line circuit. By the subsequent operation of the individual components of the line circuit being ended and by the circulation of the working medium being ended, energy consumption can be reduced.

After the end of circulation of the working medium, subsequent operation of the pump which is arranged as a feed pump of the line circuit between the feed water tank and the heat exchanger is advantageous, since the liquid working medium is removed from the feed pump and from the line section which precedes the feed pump. The feed pump is an especially sensitive component of the line circuit and is made frost-proof by being subsequently operated after the end of circulation of the working medium.

A particular advantage arises when a first valve which is arranged between the feed water tank and feed pump is closed, since the closing of the first valve prevents working medium from being sucked in from the feed water tank. As a result of the closing of the valve, the feed pump is emptied almost completely.

A further advantage arises when a second valve which is arranged in a line section between the feed pump and the heat exchanger is opened, since, as a result of the opening of the second valve, the working medium from the feed pump is distributed in the entire line section between the feed pump and heat exchanger.

The subsequent operation of the pump, which is arranged as a condensate pump between the condenser and the feed water tank, after the end of circulation of the working medium is advantageous, since working medium is conveyed out of the subsequently operated condensate pump and the condenser into the feed water tank and consequently damage to the condenser and to the condensate pump when the line circuit freezes is avoided.

When the condensate pump is subsequently operated, the closing of a first valve which is arranged between the feed water tank and feed pump is advantageous, since transport of working medium out of the feed water tank to the feed pump is avoided. Working medium which is removed from the condenser or the condensate pump as a result of the subsequent operation of the condensate pump can accumulate only in the feed water tank and is not transported into the adjoining line section between the feed water tank and feed pump.

Subsequent operation of the feed pump and of the condensate pump after the end of circulation of the working medium is advantageous, since, by both pumps being subsequently operated, the liquid working medium is displaced out of a plurality of components of the line circuit. The liquid working medium is displaced out of the feed pump, out of the condensate pump and out of the condenser and thus, at the same time, damage to these components when the line circuit freezes is avoided.

BRIEF DESCRIPTION OF THE DRAWING

An exemplary embodiment of the invention is illustrated in the drawing and is explained in more detail in the following description. A steam cycle process is illustrated diagrammatically in the single FIGURE.

DETAILED DESCRIPTION

This steam cycle process has a line circuit 4 for utilizing the waste heat of an internal combustion engine 2. A working medium circulates in the line circuit 4. At least one heat exchanger 8, an expansion machine 10, a condenser 12, a feed water tank 14 and at least one pump 6, 13 are arranged in the line circuit 4.

The internal combustion engine 2 may be configured, in particular, as an air-compression autoignition or mixture-compression spark-ignition internal combustion engine 2. The device and the associated method for the utilization of waste heat are suitable especially for applications in motor vehicles. However, the method according to the invention for the utilization of waste heat is also suitable for other applications.

The internal combustion engine 2 burns fuel in order to generate mechanical energy. The exhaust gases which in this case occur are expelled via an exhaust system in which an exhaust gas catalytic converter may be arranged. A line section 22 of the exhaust system is routed through the heat exchanger 8. Heat energy from the exhaust gases or from exhaust gas recirculation is transferred via the line section 22 in the heat exchanger 8 to the working medium in the line circuit 4, so that the working medium can be evaporated and superheated in the heat exchanger 8.

The heat exchanger 8 of the line circuit 4 is connected via a line 25 to the expansion machine 10. The expansion machine 10 may be configured as a turbine or piston machine. The evaporated working medium flows via the line 25 to the expansion machine 10 and drives the latter. The expansion machine 10 has a drive shaft 11, via which the expansion machine 10 is connected to a load. As a result, for example, mechanical energy can be transmitted to a drive train or serve for driving an electric generator of a pump or the like. After flowing through the expansion machine 10, the working medium is routed via a line 26 to the condenser 12. The working medium expanded via the expansion machine 10 is condensed in the condenser 12. The condenser 12 may be connected to a cooling circuit 20. This cooling circuit 20 may be, for example, a cooling circuit of the internal combustion engine 2.

The working medium condensed in the condenser 12 is transported via a further line 27 to the feed water tank 14. A condensate pump 13, which transports the condensed working medium out of the condenser 12 to the feed water tank 14, may be located in the line 27. The feed water tank 14 serves as a reservoir for the liquid working medium in the line circuit 14.

The liquid working medium from the feed water tank 14 is transported via the line 29 into the line 24 by a feed pump 6. A first valve 15, which can be opened or closed, may be located in the line 29.

A second valve 28 is located in the line 24 and serves in the form of a pressure regulating valve for regulating the pressure of the working medium in the inflow to the heat exchanger 8. The evaporation temperature of the working medium can be regulated with the aid of the stipulated pressure in the inflow to the heat exchanger 8.

The line 24 leads directly into the heat exchanger 8 in which the working medium is evaporated and, if appropriate, superheated. The evaporated working medium arrives once again at the expansion machine 10 via the line 25. The working medium flows once again through the line circuit 4. The at least one pump 6, 13 and the expansion machine 10 determine a direction of run of the working medium through the line circuit 4. Heat energy can be extracted continuously from the exhaust gases and the constituents of the exhaust gas recirculation of the internal combustion engine 2 via the heat exchanger 8 and is discharged in the form of mechanical or electrical energy.

The working medium used may be water or another liquid which conforms to the thermodynamic requirements. The working medium, when it flows through the line circuit 4, undergoes thermodynamic state changes which correspond ideally to a rankine cycle process. The working medium is compressed in the liquid phase by the feed pump 6 to the pressure level for evaporation. The heat energy of the exhaust gas is then discharged to the working medium via the heat exchanger 8. In this case, the working medium is evaporated isobarically and is then superheated. The steam is thereafter expanded adiabatically in the expansion machine 10. In this case, mechanical or electrical energy is obtained. The vaporous working medium is then cooled in the condenser 12 and is delivered to the heat exchanger 8 via the feed pump 6.

Since water or other liquids which may freeze at low temperatures are being used, the line circuit 4 or parts of the line circuit 4 having especially sensitive components must be made frost-proof. When the working medium freezes, it undergoes a state change in which it may solidify and expand. Components of the line circuit 4 may be destroyed during this occurrence. The method according to the invention for operating a steam cycle process for utilizing the waste heat of an internal combustion engine affords a possibility of making components of the line circuit 4 frost-proof by the partial emptying of liquid working medium. In this case, after the end of circulation of the working medium, at least one of the pumps 6, 13 is subsequently operated in order to empty the working medium at least from the subsequently operated pump 6, 13.

If the pump, which is arranged as a feed pump 6 of a line circuit 4 between the feed water tank 14 and the heat exchanger 8, is subsequently operated after the end of circulation of the working medium, liquid working medium is displaced out of the feed pump 6 and the line 29. The liquid working medium which is still in the feed pump 6 or the line 29 after the end of circulation of the working medium is transported out of the feed pump 6 into the line 24. The liquid working medium being emptied or partially emptied out of the feed pump 6, only a small fraction of the liquid working medium is still located in the feed pump 6. If freezing of the line circuit 4 occurs, the remaining quantity of liquid working medium in the feed pump 6 is not critical and, if it freezes, cannot cause damage to the feed pump 6.

In order to prevent liquid working medium from being sucked in from the feed water tank 14 as a result of the subsequent operation of the feed pump 6, the first valve 15, which is arranged between the feed water tank 14 and feed pump 6, can be closed after the end of circulation of the working medium. The first valve 15 being closed, the feed pump 6 sucks in only water which is located in the line 29 between the first valve 15 and the feed pump 6. This is only a small quantity of liquid working medium in the line 29 between the first valve 15 and feed pump 6 and is conveyed through the feed pump 6 into the line 24 as a result of the subsequent operation of the feed pump.

If a second valve 28 is located in the line section 24, this second valve 28 is opened after the end of circulation of the working medium. The second valve 28 being opened, the liquid working medium from the feed pump 6 and the line 29 between the first valve 15 and the feed pump 6 can be distributed in the entire line section 24.

In a further exemplary embodiment of the method according to the invention, the condensate pump 13 is subsequently operated after the end of circulation of the working medium, in order to convey liquid working medium at least out of the subsequently operated condensate pump 13 and the condenser 12 into the feed water tank 14. If the condensate pump 13 is subsequently operated after the end of circulation of the working medium, it sucks in the liquid working medium still located in the condenser 12 and transports this liquid working medium through the line 27 to the feed water tank 14. In addition, liquid working medium located in the line 27 is transported into the feed water tank 14. The condensate pump 13 empties itself by subsequently being operated after the end of circulation of the working medium. As a result of this action, only a small quantity of liquid working medium is still present in the condensate pump 13 and in the condenser 12 and, in the event of freezing, cannot cause damage to the condensate pump 13 or to the condenser 12.

The first valve 15 in the line 29 being closed, further transport of the liquid working medium out of the feed water tank 14 to the feed pump 6 is prevented. The liquid working medium which was transported into the feed water tank 14 by the condensate pump 13 cannot pass out of the feed water tank 14 through the line 29 to the feed pump 6.

In addition to the separate subsequent operation of the feed pump 6 and of the condensate pump 13 after the end of circulation of the working medium, both pumps 6, 13 may also be subsequently operated simultaneously. By the feed pump 6 and the condensate pump 13 being subsequently operated simultaneously after the end of circulation of the working medium, more rapid emptying of the frost-sensitive components of the line circuit, such as, for example, feed pump 6, condenser 12 and condensate pump 13, is made possible.

Ending of circulation of the working medium may occur after a standstill of the internal combustion engine 2, since, after the standstill of the internal combustion engine 2, thermal energy is no longer discharged to the working medium in the line circuit 4. Subsequent operation of the components of the line circuit 4 is not expedient in this case since thermal energy from the exhaust gases of the internal combustion engine 2 cannot be converted into the thermal or electrical energy by the expansion machine 10. However, ending of circulation may also occur as a result of other operating conditions of the internal combustion engine or of the line circuit.

Subsequent operation of one or more pumps 6, 13 of the line circuit 4 after the end of circulation of the working medium is ended as soon as one or more subsequently operated pumps 6, 13 have run empty.

After the ending of the subsequent operation of the feed pump 6, the second valve 28 in the line 24 may be closed in order to prevent the working medium from flowing out of the line 24 and the heat exchanger 8 back into the feed pump 6.

What is claimed is:

1. A method for operating a steam cycle process for utilizing the waste heat of an internal combustion engine (2), with a line circuit (4) in which a working medium can be circulated, with at least one pump (6, 13), at least one heat exchanger (8) coupled directly to an exhaust gas line (22) of the internal combustion engine (2), an expansion machine (10), a feed water tank (14) in order to store the liquid working medium, and a condenser (12), components of the line circuit (4) being made frost-proof as a result of the partial emptying of the liquid working medium, that the method comprising, after the end of circulation of the working medium, subsequently operating the at least one pump (6, 13) in order to empty the working medium at least out of the subsequently operated pump (6, 13), wherein the at least one pump includes a feed pump (6) of the line circuit (4) between the feed water tank (14) and the heat exchanger (8), such that fluid passing out of the feed water tank (14) first passes through the feed pump (6) and then through the heat exchanger (8).

2. The method as claimed in claim 1, characterized in that the end of circulation of the working medium occurs after a standstill of the internal combustion engine (2).

3. The method as claimed in claim 1, characterized in that a first valve (15), which is arranged between the feed water tank (14) and feed pump (6) is closed, in order to prevent working medium from being sucked in from the feed water tank (14).

4. The method as claimed in claim 3, characterized in that a second valve (28), which is arranged in a line (24) between the feed pump (6) and the heat exchanger (8), is opened so that the working medium is transported out of the feed pump (6) into the line (24) and the heat exchanger (8).

5. The method as claimed in claim 1, wherein a condensate pump (13) between the condenser (12) and the feed water tank (14) is subsequently operated after the end of circulation of the working medium, in order to convey the working medium at least out of the subsequently operated condensate pump (13) and the condenser (12) into the feed water tank (14).

6. The method as claimed in claim 5, characterized in that a first valve (15), which is arranged between the feed water tank (14) and the feed pump (6), is closed, in order to prevent the working medium from being transported out of the feed water tank (14) to the feed pump (6).

7. A method for operating a steam cycle process for utilizing the waste heat of an internal combustion engine (2), with a line circuit (4) in which a working medium can be circulated, with at least one pump (6, 13), at least one heat exchanger (8), an expansion machine (10), a feed water tank (14) in order to store the liquid working medium, and a condenser (12), components of the line circuit (4) being made frost-proof as a result of the partial emptying of the liquid working medium, that the method comprising, after the end of circulation of the working medium, subsequently operating the at least one pump (6, 13) in order to empty the working medium at least out of the subsequently operated pump (6, 13) characterized in that, after the end of circulation of the working medium, both a pump which is arranged as a feed pump (6) of the line circuit (4) between the feed water tank (14) and the heat exchanger (8) and a pump which is arranged as a condensate pump (13) between the condenser (12) and the feed water tank (14) are subsequently operated, in order to empty the working medium at least out of the two subsequently operated pumps (6, 13).

8. The method as claimed in claim 7, characterized in that the end of circulation of the working medium occurs after a standstill of the internal combustion engine (2).

9. The method as claimed in claim 7, characterized in that a first valve (15), which is arranged between the feed water tank (14) and feed pump (6) is closed, in order to prevent working medium from being sucked in from the feed water tank (14).

10. The method as claimed in claim 9, characterized in that a second valve (28), which is arranged in a line (24) between the feed pump (6) and the heat exchanger (8), is opened so that the working medium is transported out of the feed pump (6) into the line (24) and the heat exchanger (8).

11. The method as claimed in claim 7, characterized in that the condensate pump (13) is operated after the end of circulation of the working medium, in order to convey the working medium at least out of the subsequently operated condensate pump (13) and the condenser (12) into the feed water tank (14).

12. The method as claimed in claim 11, characterized in that a first valve (15), which is arranged between the feed water tank (14) and feed pump (6) is closed, in order to prevent working medium from being sucked in from the feed water tank (14).

13. A method for operating a steam cycle process for utilizing the waste heat of an internal combustion engine (2), with a line circuit (4) in which a working medium can be circulated, with at least one pump (6, 13), at least one heat exchanger (8), an expansion machine (10), a feed water tank (14) in order to store the liquid working medium, and a condenser (12), components of the line circuit (4) being made frost-proof as a result of the partial emptying of the liquid working medium, that the method comprising, after the end of circulation of the working medium, subsequently operating the at least one pump (6, 13) in order to empty the working medium at least out of the subsequently operated pump (6, 13), wherein the at least one pump includes a feed pump (6) of the line circuit (4) between the feed water tank (14) and the heat exchanger (8), wherein a first valve (15), which is arranged between the feed water tank (14) and feed pump (6) is closed, in order to prevent working medium from being sucked in from the feed water tank (14), and wherein a second valve (28), which is arranged in a line (24) between the feed pump (6) and the heat exchanger (8), is opened so that the working medium is transported out of the feed pump (6) into the line (24) and the heat exchanger (8).

14. The method as claimed in claim 13, characterized in that the end of circulation of the working medium occurs after a standstill of the internal combustion engine (2).

15. The method as claimed in claim 13, characterized in that a condensate pump (13) is subsequently operated after the end of circulation of the working medium, in order to convey the working medium at least out of the subsequently operated condensate pump (13) and the condenser (12) into the feed water tank (14).

\* \* \* \* \*